Feb. 15, 1966  E. L. COOPER  3,235,161
ELECTRICAL CONTROL FOR FRICTION WELDING
Filed Feb. 14, 1964  5 Sheets-Sheet 1
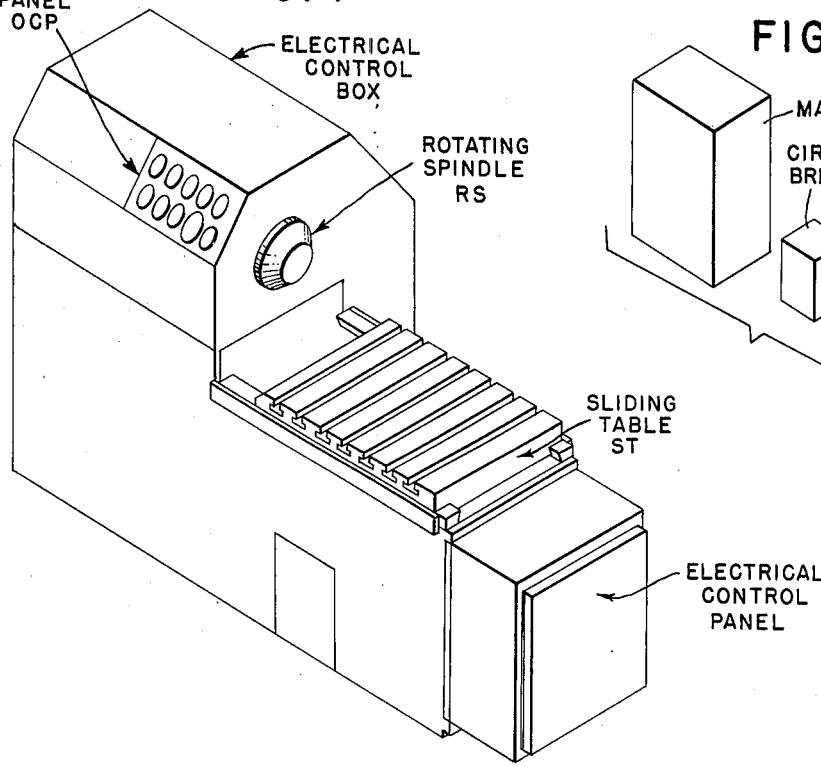
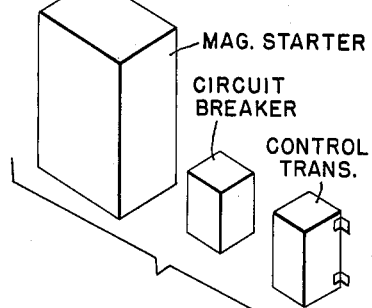
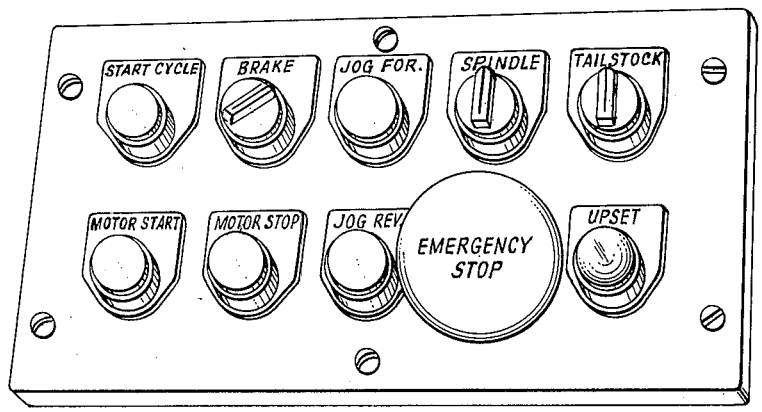
INVENTOR
EDWARD L. COOPER
BY
ATTORNEY Feb. 15, 1966          E. L. COOPER           3,235,161
             ELECTRICAL CONTROL FOR FRICTION WELDING
Filed Feb. 14, 1964
                                          5 Sheets-Sheet 3
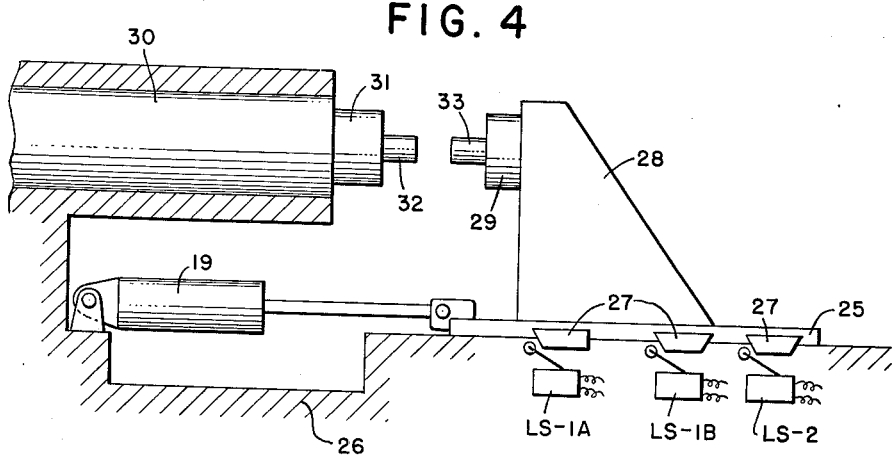
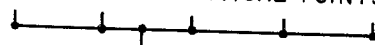
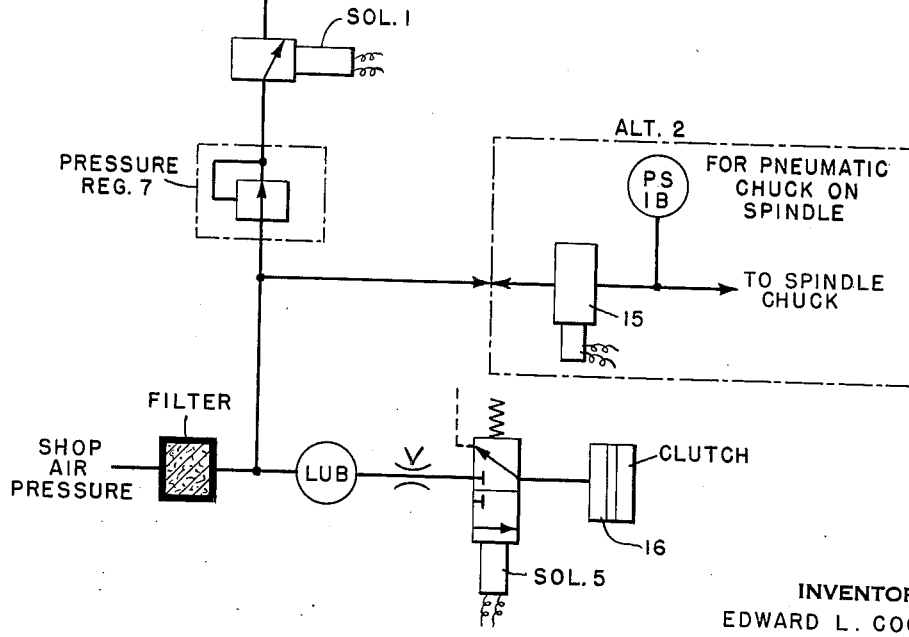
INVENTOR
EDWARD L. COOPER
BY
ATTORNEY

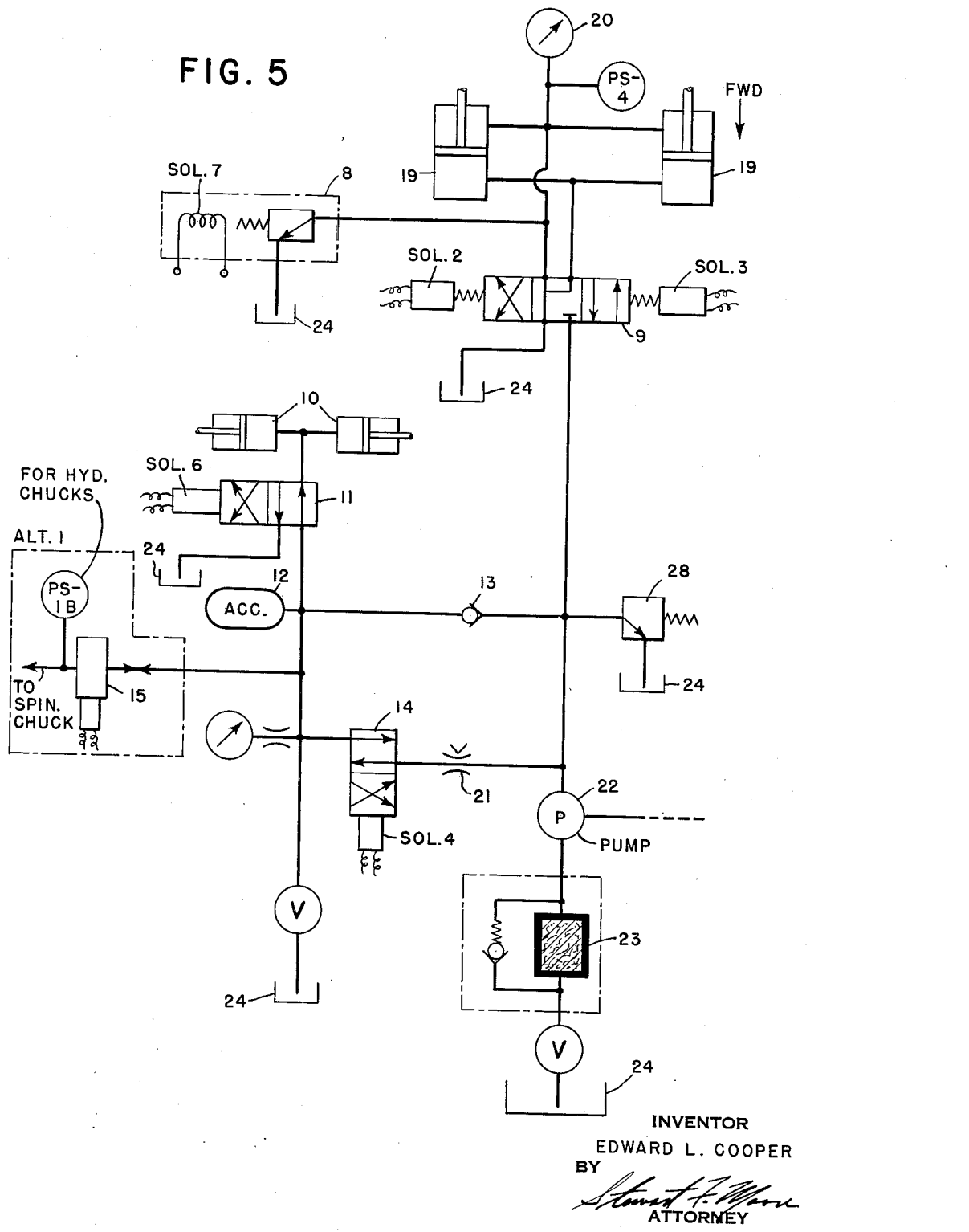

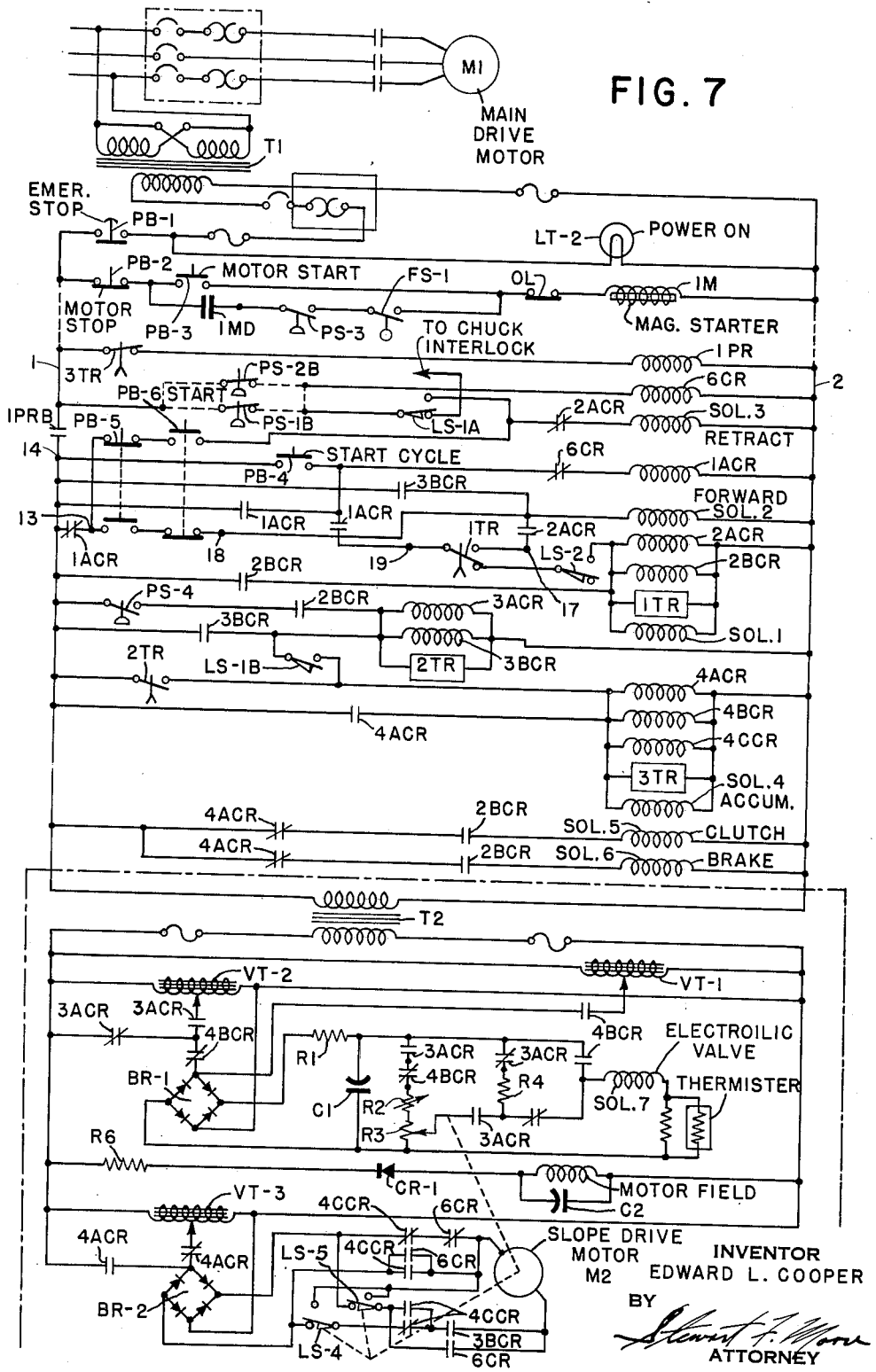

United States Patent Office 3,235,161
Patented Feb. 15, 1966

3,235,161
ELECTRICAL CONTROL FOR FRICTION WELDING
Edward L. Cooper, Chicago, Ill., assignor to American Machine & Foundry Company, a corporation of New Jersey
Filed Feb. 14, 1964, Ser. No. 344,982
8 Claims. (Cl. 228—2)

The invention relates to welding systems and particularly to friction welding systems, and to the electrical and other control arrangements used in such systems.

Theoretically, friction welding is a process in which the mechanical energy of two objects revolving in contact with each other is converted into thermal energy, which is utilized, instead of a separate heating source, to weld the two objects together. In practice, one of the two objects is held stationary while the other is rotated and pressed against the first object. Usually, after a specified time interval, the rotation is stopped and the pressure increased and held for another specified time period. If the operating conditions for the materials used in the objects involved are properly selected, whether they be metals, plastics or ceramics, a sound, high quality weld of the two objects is obtained. The exact pressure program used depends upon the materials in the objects and the size of the joints.

The control arrangements of the invention are particularly adapted for, although not limited to, use with a friction welding machine operated by a hydraulic system including a solenoid-controlled regulating valve for controlling the thrust pressure to an object being welded, such as disclosed, for example, in the French patent to Holloway et al., No. 1,316,375, issued March 6, 1962, which includes a general description of the process used for welding large tubular objects. These control arrangements were specifically devised for use with a friction welding machine utilizing both hydraulic and pneumatic controls to be described in this application.

Experimentation has shown that friction welding may be improved by causing the amount of pressure applied to the materials to be joined to follow a certain time pattern in which the pressure is caused to increase linearly with time over a certain time period, hold a set level for a given time period and then assume and hold a higher level until the end of the welding process.

A general object of the invention is to control the operation of a friction welding machine in an efficient and economical manner.

A related object is to produce efficient and economic control, including electrical control, of the operation of a friction welding machine.

A more specific object is to provide efficient and economical electrical control of the hydraulic pressure exerted on the workpieces in an automatic welding sequence of a friction welding system.

These objects are attained in accordance with the invention by a variable time control unit and slope control system for electrically controlling the level of hydraulic pressure exerted on the workpieces during an automatic welding cycle of a friction welder. The unit provides a pressure build-up time setting and several pressure level settings including a pre-heat control which sets the range of slope from zero to one pressure level, and an upset or final pressure level control, these controls being independent in operation.

More specifically, the system provides a series of D.C. voltages for controlling the operation of the control device, such as a solenoid-controlled pressure regulating valve, in the welder, in such manner as to provide a pressure pattern necessary to the proper operation of the welder and having a particular time sequence. The control system consists of two major parts one of which involves preselecting voltages to be applied to the valve while the second part involves gradually applying one of the selected voltages instead of merely suddenly switching it into effect.

Part I of the control system consists of a rectifier bridge which is supplied with A.C. voltage at separate times through either one of two variable transformers of different pre-set voltage values, the D.C. voltage output of the bridge being applied to the valve at separate times by three different types of circuits which are switched into operation under control of external signals. The first of these circuits consists of a series adjustable resistor, the second circuit consisting of a voltage divider with the valve connected in turn across the adjustable brush and one end of the divider, and the third circuit consisting of a direct connection of the valve across the D.C. terminals of the bridge.

Part II of the control system consists of a second rectifier bridge with its A.C. voltage supplied through a separate third variable transformer, preset to a selected value, and its D.C. output supplying the armature of a D.C. motor having its shaft connected to the brush shaft of the divider in such manner that it may be controlled to turn the divider shaft from one end of its travel to the other and thereby adjust the output of the divider from minimum to maximum while moving at a rotational velocity determined by the pre-set value of A.C. voltage supplied to the second bridge rectifier.

A feature of the invention is that the bridge rectifier of Part I may have its A.C. voltage switched, on receipt of an externally generated command, from control of one variable transformer to that of the other, in order to produce an abrupt change in signal to the valve as required by the welding process; and that simultaneously with the abrupt change in A.C. input, the valve connections may be switched from control of the divider circuit to the direct connection described above; and that in the absence of the alternate external commands, the valve will remain connected to the bridge through the series variable resistor adjusted to provide a suitable voltage to the valve depending on the setting of the variable transformer supplying the A.C. input to the first rectifier bridge.

Another feature is the provision of limit switches which are cam operated by the slope drive motor and have been preset to stop its rotation at the extreme limits of the potentiometer divider and to provide a short across the motor-armature to prevent "drift" of the motor. Also, the drive motor is connected to the second bridge via relays so arranged that on receipt of the signal to switch control of the valve from the divider to the direct connection across the D.C. output of the bridge, the motor is also given a signal to return the divider to its starting position at which time the limit switches act as described above to stop the motor so as to prevent "drift" until the cycle is restarted.

The above and other objects and features of the invention will be better understood from the following detailed description thereof when it is read in conjunction with the several figures of the accompanying drawings in which:

FIGS. 1–1A are outline perspective views of a friction welder utilizing hydraulic and pneumatic controls and associated power control apparatus, with which the control arrangements of the invention are used, with the points of connection of the control utilities indicated thereon;

FIG. 2 is a front view of the operator's electrical control board of the friction welder of FIG. 1;

FIG. 4 shows in simplified form the basic mechanical portion of the friction welder of FIG. 1 including the chucks and sliding table, and the electrical and other controls therefor;

FIG. 5 shows a simplified schematic diagram of the hydraulic control circuitry used with the friction welder of FIGS. 1 and 4;

FIG. 6 shows a simplified schematic diagram of the pneumatic circuitry used with the friction welder of FIGS. 1 and 4;

FIG. 7 shows a simplified electrical diagram of the power control circuitry and the circuits used for producing the automatic pressure cycle of FIG. 3.

Figure 3:
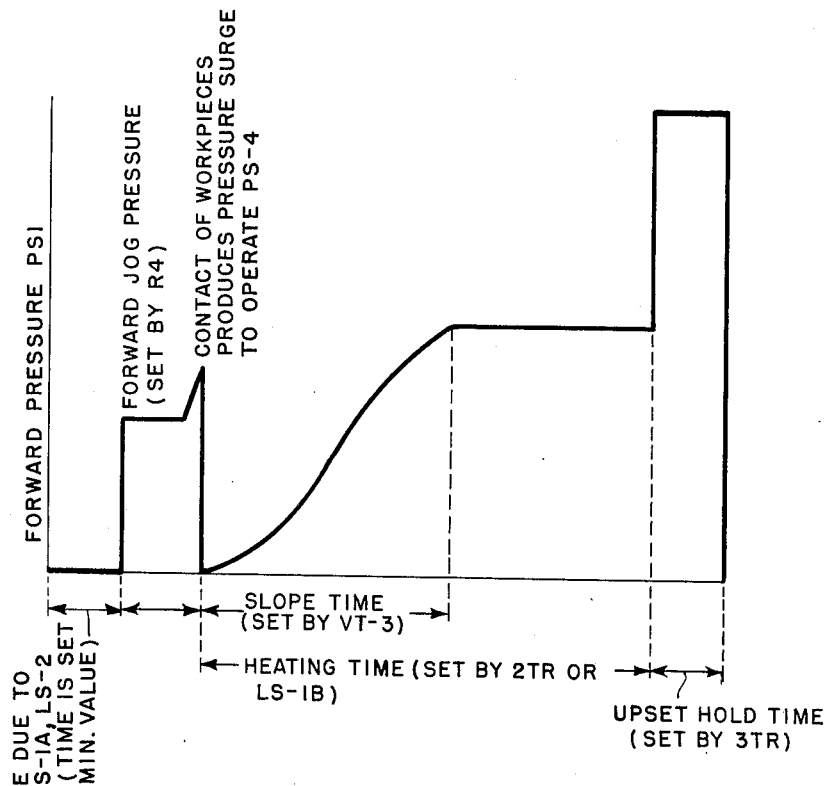
FIG. 3 shows a time pressure curve of a typical forward pressure welding cycle with automatic control for providing optimum welding operation of a friction welder such as shown in FIG. 1, with associated electrical controls for producing various operations therein in accordance with the invention, as indicated on the figure by suitable legends and reference characters.

FIG. 1 shows the general configuration of the friction welder to which the control arrangements of the invention are applied, together with points of connection for the control utilities required. This machine briefly described consists of a very rigid frame with a specially designed heavy-duty, high-thrust rotatable spindle RS mounted at one end thereof and a sliding table ST equipped with T slots mounted at the other end. The table ST is actuated by a pair of hydraulic cylinders located inside the frame and under the spindle RS. Hydraulic power is supplied by a pump mounted in line with the main spindle drive motor. The spindle drive motor is connected through a belt drive to a jackshaft mounted on the back of the machine frame.

An air clutch, mounted on the jackshaft, connects the output drive pulley with the jackshaft thereby supplying power therefrom through a second belt to a pulley mounted directly on the spindle. A primary hydraulic brake is also mounted on the spindle to provide the rapid deceleration required for the welding process. A secondary hydraulic brake operates on the jackshaft pulley and clutch to provide adequate braking of the inertial load of the free-running portion of the clutch.

Hydraulic control valves and hydraulic circuits are mounted on brackets at the left-hand end of the machine (as viewed by the operator), while the hydraulic reservoir or sump is integral with the machine frame. A pneumatic unit, mounted beneath the table in the front of the machine, supplies filtered, lubricated air to the clutch, and filtered air at reduced pressure to the mist generator, located at the rear of the machine behind the spindle. Mist lubrication is supplied to all high-speed bearings and to the ways on which the table slides. An accumulator mounted inside the main frame supplies additional high-pressure oil for forging operations in the welding cycle, and for operation of the brakes. When hydraulic chucks are used, the accumulator supplies them with pressure in the event of a pump or power failure.

An electrical control box ECB mounted on the right-hand end of the machine houses the timers and pressure control equipment that provide the automatic welding cycle. A push-button station or operator's control panel OCP located above the spindle, within easy reach of the operator's hand, makes available to the operator all controls necessary for the normal operation of the machine. A pressure gauge mounted on the cover near the spindle nose registers the "forward" pressure supplied to the actuating cylinders. A junction or electrical connection box at the rear of the machine provides termination points for hydraulic and pneumatic valve solenoids, push button control cabling, signal circuits from the control box, and the control wiring necessary to interconnect with the wall or ceiling-mounted power units which comprise a magnetic starter, the control transformer and the control-voltage circuit breaker.

FIG. 2 shows the front view of the push-button station or operator's control panel OCP on the machine of FIG. 1. As shown, it includes a Motor Start, Motor Stop, Start Cycle, Emergency Stop, JOG FOR and JOG REV push buttons; Brake, Spindle and Tailstock switches; and an upset incandescent lamp, the purposes of which will be described later in connection with operation of the machine.

FIG. 3 shows a time-pressure curve or a typical forward pressure cycle under automatic control with electrical control elements that must be adjusted to obtain a specific pressure-time sequence for optimum welding in accordance with the invention. These include limit switches LS–1A, LS–2 operated by cams mounted on the sliding table ST of the welding machine, and timing relay 1TR for a pressure build-up time setting; a potentiometer R4 setting the forward jog pressure; pressure switch PS–4 operated by a pressure surge; a slope time set by variable transformer VT–3; a pre-heat pressure control $P_1$ set by variable transformer VT–2; overall heating time set by time relay 2TR or limit switch LS–1B; an upset or final pressure level control set by variable transformer VT–1; and an upset hold time or forging pressure set by timing relay 3TR. The operation of this control unit will be further described in connection with the description of the automatic cycle.

The control system for the friction welder of FIG. 1, which includes hydraulic, pneumatic and electrical components, will be described in connection with the simplified drawings of FIGS. 4 to 7. The power drives and controls for the system are omitted from the first three of these figures for simplicity since they are standard in nature, whereas the improvements of the invention reside in the control of sequence of steps in the welding process and in the interlocking of control functions.

Referring to FIG. 4, showing the friction welder in very simplified form, the basic mechanical portion thereof which is controlled includes a table 25 sliding on a frame 26 under control of the pressure cylinders 19 to bring a non-rotating workpiece 33 held in chuck 29 mounted to the table 25 by a fixture 28, and a rotating workpiece 32 held in a rotatable spindle chuck 31 mounted in the spindle 30 which is also firmly supported by the common frame 26, out of and into contact at the required pressure and for the required time intervals. Mounted on the table 25 are cams 27 used to actuate the limit switches LS–1A, LS–1B and LS–2 at selected positions of the table 25 for a purpose to be brought out later.

Referring now to FIG. 5, showing the simplified hydraulic schematic diagram, the cylinders 19 are actuated by hydraulic pressure created by a pump 22 drawing hydraulic fluid from a sump or reservoir 24 through a filter 23. The output pressure of the pump 22 is limited to a selected maximum value by a regulating valve 28, and is supplied to the pressure port of the solenoid-controlled valve 9 the spool of which, in the neutral position, blocks the pressure port and connects both ends of the valve 9 to the sump 24. When the solenoid SOL–3 of valve 9 is energized, the spool is moved to the left from the position shown in the figure to connect the pressure line so that it supplies pressure to the major area of the pistons in cylinders 19. This extends the associated rods, moving the table 25 (FIG. 4) away from the spindle (retract). When solenoid SOL–2 of valve 9 is energized, the spool of that valve moves from the right of the position shown in the figure causing pressure to be supplied to the minor area of the pistons in cylinders 19 causing them to contract and pull the table 25 (FIG. 4) towards the spindle (forward). When a "forward" pressure is supplied, its value may be read on gauge 20 (FIG. 5), and its maximum value at any time is determined by the level of the current in the solenoid SOL–7 of the electroilic valve 8. Valve 8 determines forward pressure, under control of electrical circuits in FIG. 7, by providing controlled flow of fluid to sump 24. Forward pressure is also applied to pressure switch PS–4 (FIG. 5) which is used to "sense"

the pressure transient created when the workpieces first make contact as the table 25 (FIG. 4) is moved forward under control of the JOG FOR switch on the operator control panel OCP (FIG. 2).

Referring again to FIG. 5, regulated pump pressure is supplied through check valve 13 to the accumulator 12, to brake valve 11, to accumulator valve 14, and (when used) to hydraulic chucks (ALT-1). When the solenoid SOL-6 of brake valve 11 is energized, pressure is removed from the brakes 10 and they are connected to sump 24 through the valve. When the solenoid SOL-6 is not energized, pressure is supplied to the brakes 10 and the spindle 30 (FIG. 4) connected thereto is prevented from rotating.

When the solenoid SOL-4 of valve 14 is energized, valve 14 connects the accumulator line to the pump output, through adjustable flow valve 21 to reinforce the pump output of oil so that full required pressure may be maintained during the increments of movement of the table 25 (FIG. 4) which occurs instantaneously as the forging welding phase is carried out. When solenoid SOL-4 is not energized, accumulator pressure is blocked from valve 21 by valve 14 and from returning from the pump output line by check valve 13. When hydraulic chucks are used (ALT-1), they are supplied with hydraulic pressure by valve 15 and chuck pressure is also supplied to the pressure switch PS-1B for a purpose which will be brought out later.

Referring now to FIG. 6, the pneumatic control includes a mist lubrication generating system which lubricates the spindle, all high-speed bearings and the ways of table 25. When the solenoid SOL-1 is energized, pressure from the air supply line is supplied to the mist generating system. Also included in the pneumatic circuit is the supply to the clutch 16 to engage it. When pneumatic chucks are used (ALT-2), they are supplied with air through a valve 15. At the same time pressure would be supplied to pressure switch PS-1B.

The electrical control system of the friction welder of FIGS. 1 and 4 consists of: the power control circuitry; the control solenoids, the function of which is to control the application of hydraulic and mechanical power necessary for welding; relays which control the sequence of events, and a D.C. control system or slope control unit, which controls the level of hydraulic pressure exerted on the workpieces during the welding sequence.

The components of this system are located at one of four locations on or near the machine which are an electrical control cabinet, an electrical control board or operator's panel OCP, shown in FIG. 2, and an electrical control junction box on the rear of the machine. The power units, which are either wall mounted or attached to the machine, include the magnetic starter, the control transformer and the circuit breaker as shown in FIG. 1. Limit switches, solenoid pressure switches and other control and interlocks located elsewhere in the machine are connected to terminal boards at one of the four above locations.

The control schematic of FIG. 7 shows both power wiring and the control wiring.

POWER CONTROL CIRCUITRY AND CONTROL INTERLOCKS

Starting the main motor

Referring to FIG. 7, the main drive motor M1 is started by depressing the Motor Start push button PB-3 which picks up the contactor 1M (the magnetic starter) to supply line voltage to the motor leads. This contactor will seal itself in through auxiliary contacts 1MD, if pressure switch PS-3 located in the air line to the lubrication system is closed indicating that the lubrication air supply is adequate, and if float switch FS-1 is closed indicating the level of oil in the lubricating system is adequate for safe operation.

CONTROL INTERLOCKS

Emergency stop button

The push-button switch PB-1, shown in series with fuses which protect the secondary of the control transformer T1, is an emergency stop button and is located on the push-button panel (FIG. 2). When momentarily depressed it removes all power from the control system and will accomplish the following: (a) de-energize the main motor contactor, (b) de-energize all relays which have been actuated by completed portions of the cycle, (c) cause the clutch to disengage and the brake to be applied, and (d) insure that the chucks remain locked by removing all voltage from the chuck control circuits. Removing voltage from the chuck solenoids results in the continued application of hydraulic or pneumatic pressure to the chucks so that the workpieces cannot become loose in the chucks.

Power relay operation

The power relay 1PR is energized as soon as control voltage is turned on and, through its contacts 1PRB, provides control voltage for operation of all relays and the D.C. power supply. Relay 1PR is held in an energized condition through the normally closed contacts of time delay relay 3TR. The time delay relay 3TR starts timing when forging pressure is applied, and, when the weld is completed, operates to open the circuit, temporarily removing voltage from the coil of the power relay 1PR. Relay 1PR then drops out temporarily, de-energizing all relays previously operated by the cycle and thereby resetting the entire control system for the next operation. In addition, a normally closed set of contacts 1PRA operate to initiate automatic opening of both chucks as described below. Since 3TR is also reset by the opening of 1PRB, its contacts reclose, re-energizing 1PR.

Control voltage is supplied between bus lines 1 and 2 and is further supplied between busses 14 and 2 by the closing of contacts 1PRB of the power relay 1PR. As soon as control power is turned on, relay 1PR is energized through the NC contact of upset hold timer 3TR.

Jog control

Jog control of the table 25 (FIG. 4) is provided through push-button switches (FIG. 7) which are mutually dependent on their action, i.e., "one must be unoperated if the other is to be operated." A normally closed contact of relay 1ACR disables both jog circuits during automatic operation.

Chuck interlocks

Provisions are made for interlocking any chucking system using hydraulic or pneumatic power, so that pressure switches connected mechanically as illustrated by ALT-1 (FIG. 5) or ALT-2 (FIG. 6) and receiving pressure when the chucks are closed, must open contacts to de-energize relay 6CR (FIG. 7), i.e., PS-1B spindle chuck pressure switch (FIG. 5) and a similar switch not shown in FIGS. 5 and 6, but similarly arranged in any tailstock chuck pressure circuit, have their electrical contacts in parallel as illustrated in FIG. 7 and in this manner hold relay 6CR until both chucks are receiving "closing" pressure. Safety relay 6CR has contacts in series with relay 1ACR to prevent these relays being energized with either power chuck in the operation.

Assuming both chucks are closed and the table is in proper position for loading, relay 6CR is de-energized, limit switch LS-1A and limits switches LS-1B are not operated by their cams 27, and LS-2 is in the *operated* position (FIG. 4), automatic operation is now possible.

Automatic operation

The start cycle switch PB-4 is depressed energizing relay 1ACR which "seals in," disabling the jog circuits and energizing through its own contacts 1TR and LS-2, the 2ACR, 2BCR, 1TR relays and applying air pressure to the lubrication system via solenoid 1.

Relays 2ACR and 2BCR seal in through normally open contacts, disable "retract" solenoid 3 through opening of normally closed contacts in series with solenoid 3, engage the clutch through the closing of normally open contacts in series with solenoid 5 and release the brake by the closing of normally open contacts in series with solenoid 6. In addition, a set of normally open contacts between PS–4 and relays 3ACR, etc., are closed to enable the pressure switch PS–4 to initiate the operation of relay 3ACR at the proper point later in the cycle. As "forward" delay relay 1TR times out, it closes a circuit through normally open contacts of 2ACR to the forward solenoid SOL–2 causing the table to move forward. As the workpiece 33 comes in contact with the rotating workpiece 32 (FIG. 4), pressure switch PS–4 (FIG. 7 and FIG. 5) "senses" the pressure transient created by contact and closes to energize relay 3ACR, etc.

Heating phase

Relays 3ACR and 2BCR and timer 2TR are now energized. Contacts of these relays are used to "seal in" their own operation, through normally open contacts and to further seal in the operation of the forward solenoid SOL–2 through normally open contacts. In addition, normally open contacts initiate rotation of the slope drive motor to operate a potentiometer R3 to gradually increase the voltage applied to the coil of the electroilic valve 8 (FIG. 5), thus gradually increasing the pressure applied at the interface between the workpieces through control of pressure supplied to the cylinders 19 (FIG. 5). As heating time relay 2TR completes its timing cycle, indicating that the workpieces 32 and 33 (FIG. 4) have been in contact for a time sufficient to have heated them to the desired temperature, its normally open contacts close to energize relay 4ACR, etc.

Forging phase

Relays 4ACR, 4BCR and 4CCR are energized simultaneously with hold timer 3TR and solenoid SOL–4 of the accumulator valve 14 (FIG. 5). Contacts of the 4ACR, 4BCR and 4CCR relays perform the following functions: normally closed contacts are opened to disengage the clutch by de-energizing solenoid SOL–5 and to apply the brake by de-energizing solenoid SOL–6. Switching functions are performed in the D.C. supply circuit to apply a new predetermined pressure to the electroilic valve 8 (FIG. 5) by applying a new voltage level to its coil (solenoid SOL–7). Other contacts are used to reset the slope motor and to "seal in" this group of relays.

As upset hold timer 3TR completes its timing function, its normally closed contacts open to de-energize power relay 1PR. This action opens the contacts 1PRB between bus 1 and bus 14 thereby de-energizing all relays and solenoids connected in any manner between bus 14 and bus 2. Since at this instant, upset hold timer 3TR itself is de-energized, its contacts return to the closed position again re-energizing relay 1PR and closing contacts 1PRB, restoring power to bus 14 but leaving all relays and components in the "reset" condition.

At this point in the cycle the table is in the forward position and limit switch LS–1A (FIG. 4) has been operated by one of the cams 27 so that it is now in a position to supply voltage to the "retract" solenoid SOL–3 through the now closed NC contacts of 2ACR as soon as either pressure switch PS–1B or PS–2B closes due to the removal of operating pressure from one of the chucks. With the energizing of "retract" solenoid SOL–3 the table operating cylinders 19 (FIG. 5) are provided with pressure to move them to an extended position thereby pushing the table away from the spindle until the "load" position has been reached. Since it was necessary to open at least one of the chucks in order to provide a "retract" signal solenoid SOL–3 no danger exists that the newly welded piece will be subjected to tension forces. When the table reaches the load position, cam 27 moves away from limit switch LS–1A (FIG. 4) allowing it to return to its normal position and stopping the retract motion of the table thereby completing an automatic cycle with the table in the correct position for reloading and with all relays reset for the next cycle.

Limit switch LS–1B is included for two purposes. Depending upon the adjustment of its cam 27, it may be used (a) as a safety device to operate the clutch and brake before it is possible for the chucks 31 and 29 (FIG. 4) to come in contact should the cycle time set be incorrect for the material or parts size being used or, (b) it may be used to perform the same function as timer 2TR so that the cycle progresses to the forging phase (operation of 4ACR relays), as soon as a desired overall length dimension of the welded part has been attained during the heating phase as evidenced by the relative position of table and spindle.

The automatic pressure cycle as shown in the curves of FIG. 5 will now be described in more detail with reference to FIG. 7 of the drawings.

It is divided into the following 5 steps, corresponding to the different times of operations of the relays:

(1) Relay 1ACR;
(2) Relays 2ACR, 2BCR, 1TR, and SOL–1;
(3) Relays 3ACR, 3BCR, and 2TR;
(4) Relays 4ACR, 4BCR, 4CCR, 3TR, and SOL–4;
(5) Completion of cycle.

Step 1.—Relay 1ACR

This relay performs certain interlocking functions to prevent the chucks from being opened and the jog switches from being used. In addition, its function is to complete and seal in the circuits which start the automatic sequence of events required to execute the weld cycle. Relay 1ACR is energized by depressing START CYCLE button PB4. This will energize 1ACR only if (a) both chucks are closed, and (b) the table is in the load position, so that relay 6CR is de-energized to maintain its "normally closed" contacts in series with the coil of 1ACR in the closed condition. This double interlock in the start cycle circuit insures that the table is in the proper position and that both chucks are closed prior to initiating an automatic cycle.

When 1ACR has been energized, voltage is supplied through the normally closed contact of the forward delay relay 1TR to limit switch LS–2 and, through its normally closed contact, to point 23 to energize the "retract" solenoid SOL–3. The table will then retract until a cam thereon raises LS–2 sufficiently to actuate the switch and energize relay 2ACR.

Step 2.—Relay 2ACR, 2BCR, 1TR, SOL–1

As soon as the table retracts sufficiently far enough to operate LS–2, the above relays are energized and are sealed in through a set of normally open contacts on relay 2ACR. Simultaneously, normally open contacts of 2BCR close to engage the clutch and release the brake. Relay 2ACR acts to disable SOL–3 (tailstock retract) and to enable SOL–2 (tailstock forward). Since there is still no complete circuit to energize SOL–2, no forward motion occurs until the forward delay relay 1TR times out. When this occurs, the 1TR contact closes the circuit between points 19 and 17, completing the energizing of SOL–2 and causing the table to move toward the spindle. Relay 2BCR, which was closed by the retraction of the table, now enables the pressure switch PS–4 to initiate the start of slope at the exact point when the workpieces make contact, the table now moving in the forward direction.

Step 3.—Relay 3ACR, 3BCR, 2TR

When the table reaches the point where the workpieces make contact, hydraulic pressure rises rapidly, causing PS-4 to close. Relays 3ACR, 3BCR, and 2TR are energized by PS-4 and are sealed in the energized position through relay 3BCR's normally open contacts. Relay contacts on 3BCR close to start the slope drive motor M2 in its function of driving the control potentiometer R3. This action raises the voltage supplied to the electroilic valve (SOL-7). A form "C" contact on 3ACR simultaneously switches the A.C. input voltage for the D.C. power supply from line voltage to the voltage selected on VT-2.

An additional form "C" contact on 3ACR switches the control of the D.C. level from potentiometer R4 to potentiometer R3. It also connects the brush of potentiometer R3 to the electroilic valve SOL-7. The slope drive motor continues to drive the potentiometer until the full voltage selected has been applied to SOL-7. At this time, limit switch LS-4 is actuated to stop the slope drive motor. Constant pressure is supplied to the workpieces, proportional to the constant voltage supplied to the D.C. power supply, from the time the slope drive motor reaches its upper limit until relay 2TR times out to energize relay 4ACR.

Step 4.—Relay 4ACR, 4BCR, 4CCR, 3TR, and SOL-4 (accumulator)

The closing of the normally open contacts of 2TR energizes the above relays which are then sealed in through the normally open 4ACR contacts. The opening of the normally closed 4ACR contacts disengages the clutch and applies the brake on the welding machine. Simultaneously, a form "C" contact of 4BCR switches the A.C. voltage to the D.C. power supply from the value set by VT-2 to that set by VT-1. In addition, 4BCR contacts switch control of the electroilic valve solenoid from the potentiometer circuit R3 and apply the new D.C. voltage directly to SOL-7, increasing the hydraulic pressure to the value selected for forging by adjustment of VT-1 ($P_2$-set).

The relay contacts 4ACR operate to apply reverse voltage to the armature of the slope drive motor M2. At the same time, a form "C" 4ACR contact switches the A.C. voltage to the motor drive rectifier from the reduced voltage preselected on VT-3 to full line voltage, for rapid reversal of the slope drive motor. The slope drive motor M2 then drives in the reverse direction until LS-5 is operated to stop its rotation. (Note: As soon as reverse rotation is initiated, motor limit switch LS-3 is restored to its normal position.)

Forging pressure is now applied at the preset value $P_2$, (VT-1) until relay 3TR times out. During this period, SOL-4 is energized to supply high-pressure oil from the accumulator. This maintains desired ($P_2$) pressure during the rapid forward motion of the table, which occurs as the material is forced out from the weld interface and the parts are upset by the action of forging pressure ($P_2$).

Step 5

When 3TR times out, it opens the circuit to relay 1PR which then opens its contacts between 1 and 14 to de-energize all of the relays concerned with the automatic cycle and restores them to their initial position, thus completing the cycle and removing forging pressure from the workpiece. At this point, the upset light, which was energized when the No. 4 relays were energized, will now go out, indicating that upset is complete and welded parts may be removed from the machine as soon as it returns to the "load" position.

Operation of the D.C. power supply

Parts of the operation of the D.C. power supply have been described above in the description of the automatic cycle, but it will now be described in its entirety in order to clarify its function and adjustment.

The D.C. power supply receives its A.C. voltage from transformer T2, which is a regulating transformer capable of putting out 108 volts on its secondary winding, while the primary voltage fluctuates from 90 to 130 volts. The secondary of this transformer supplies voltage to the variable transformers VT-2 ($P_1$-set), VT-1 ($P_2$-set), VT-3 (armature voltage/slope time) and, through resistor R6 and half-wave rectifier CR-1, to the field of the D.C. slope drive motor M2.

During jogging operations, and during table motion within the automatic cycle, prior to the time when slope has started (before relay 3ACR is energized), full line voltage from the regulating transformer T2 is supplied to rectifier bridge BR-1. The output of this bridge is applied through resistor R1 across capacitor C1 to supply the circuits feeding the electroilic valve (SOL-7). The voltage appearing across points 38 and 39 is supplied to the electroilic valve SOL-7 in three different ways, depending upon the mode of operation being used. During the period when BR-1 is receiving full voltage of the regulating transformer (prior to operation of 3ACR), the electroilic valve receives voltage from point 38, through series potentiometer R4 and normally closed contacts of 3ACR and 4BCR. Adjustment of this potentiometer then determines the maximum "forward" pressure which can be delivered to the cylinders either in jog forward or in the forward cycle prior to start of slope. Retract pressure is always full system pressure.

When slope starts (relay 3ACR is actuated) 3ACR form "C" contact actuates to switch control of the electroilic valve from series potentiometer R4 to resistor R2 and potentiometer R3. These two elements act as a voltage divider whose output voltage is supplied through the 3ACR normally open contact (now closed), and 4BCR normally closed contact, to the electroilic valve. Since at the beginning of slope, this divider is in a position such that no voltage appears on the brush of R3, voltage to the electroilic valve is reduced to zero and the hydraulic pressure drops to a minimum. The voltage appearing across terminals 38 and 39 (the output of bridge BR-1), is at this time a function of the setting of VT-2 ($P_1$-set) and, as the slope drive motor drives the brush of potentiometer R3 towards R3's upper limit, the maximum voltage ultimately applied to SOL-7 is that determined by the setting of VT-2.

At the end of the heating cycle, after pressure $P_1$ has been reached and held for the prescribed amount of time determined by the setting of heating time relay 2TR, the spindle is stopped and forging pressure is applied by switching the A.C. voltage applied to rectifier bridge BR-1, from the voltage preset on VT-2 ($P_1$-set), to the voltage preset on VT-1 ($P_2$-set). In addition, contacts of 4BCR disengage the voltage divider (R2 and R3), and close to connect point 38 directly to point 46. This supplies the full output voltage of the rectifier bridge BR-1 directly to SOL-7, causing the hydraulic pressure supplied to the forward side of the pistons to jump immediately to a value proportional to the setting of VT-1.

The reversal and resetting of the slope drive motor M2 was described about in the paragraph detailing the action of the 4ACR, 4BCR, and 4CCR relays. An additional set of contacts from relay 6CR duplicates the function of the 4CCR contacts, to provide a means of resetting the slope drive motor M2 in the event that the emergency stop button has been depressed during automatic cycle, after slope has started, and before upset has occurred (before relay 4ACR can operate).

Adjustment of limit switches LS-4 and LS-5

These limit switches are actuated by the slope drive motor and should be set so that LS-4 is actuated as the motor drives to the end of R3's range in the upward direction (toward the terminal point No. 43). LS-5 should be adjusted so that it is actuated as the motor drives the R3 potentiometer in the opposite direction and the brush reaches the low voltage end of R3 (point 39).

Various modifications of the control circuit, variable time control circuit or slope control unit of the friction welder illustrated and described which are within the spirit and scope of the invention will be apparent to persons skilled in the art.

What is claimed is:

1. In combination with a friction welder including a voltage-responsive hydraulic pressure regulating valve for electrically controlling the thrust pressure applied to the objects being welded, a control system for supplying a series of direct-current voltages of proper values and in a proper time sequence during build-up, pre-heating and forging phases of the welding cycle necessary for optimum pressure operation of the welder, said system including a source of alternating voltage, two preset transformers and a full-wave rectifier bridge having terminals separately connected to said A.C. source through respective ones of said two transformers and having its D.C. voltage output applied to the valve at separate times by three distinct circuits, the first one consisting of a series adjustable resistor connecting the valve to the D.C. terminals of the bridge, the second circuit consisting of a voltage divider connected across the D.C. terminals of the bridge with the valve connected in turn across the variable connection of the divider and one end thereof and the third circuit consisting of a direct connection of the valve across the D.C. terminals of the bridge.

2. The combination of claim 1, and in which said control means includes means under control of an externally generated command from the operator of the friction welder for switching the input A.C. voltage from control of one transformer to that of the other, in order to produce an abrupt change in signal to the valve as required by the welding process, and that simultaneously with the abrupt change in A.C. input, and therefore in D.C. voltage output, the valve connection may be switched from control of said divider to a direct connection across the D.C. terminals of the bridge.

3. The combination of claim 2, in which in the absence of alternate external commands from the operator of the welder, the valve will remain connected to the bridge through said series variable resistor, adjusted to provide a suitable voltage to the valve depending on the setting of the transformers for supplying the A.C. input to the bridge.

4. In combination with a friction welder including a voltage-responsive hydraulic regulating valve for applying pressure to a workpiece being welded, a control system for supplying a series of direct current voltages to said valve including one portion comprising a source of alternating current voltage, two preset transformers, a first rectifier bridge having one set of terminals connected separately through each of said two transformers to said source of alternating voltage and a circuit including a voltage divider having a variable connection and a shaft therefor, connected across the D.C. terminals of the bridge with the valve in turn connected across the variable connection of said divider and one end thereof, and a second portion for gradually applying one of the selected voltages, directly after the workpieces are brought into contact with each other, comprising a third transformer, preset to a selected value, a second bridge rectifier connected to said A.C. voltage source through said third transformer, a D.C. motor having a field, an armature and a shaft therefor, the D.C. voltage output of said second bridge supplying the armature of said D.C. motor having its shaft connected to the shaft of the divider in such manner that it may be controlled to turn the divider shaft from one end of its travel to the other and thereby adjust the output of the divider from minimum to maximum while moving at a rotational velocity determined by the preset value of A.C. voltage supplied to the second bridge rectifier.

5. The combination of claim 4, in which a half-wave rectifier is used to supply controlling A.C. voltage from said source to the field of said motor.

6. The combination of claim 4, and in which in addition to the motor driving said divider, said second portion of said control system includes a plurality of limit switches which operate not only to stop motion of the motor shaft at the proper point in the rotation of the driven voltage divider, but also to provide a short circuit across the motor armature until it is again desired to move the divider, the purpose of the short being to prevent "drift" of the motor at no armature voltage but with field voltage still applied.

7. The combination of claim 4, in which said motor is connected to the second bridge via relays arranged so that on receipt of a signal from the operator to switch control of the device from the divider to the direct connection across the D.C. output of the second bridge, the motor is also given a signal to return the divider to its starting position at which time limit switches act to stop the motor and prevent "drift" until the cycle is restarted.

8. The combination of claim 1, in which relay means actuated by said operator cause the switching of the D.C. terminals of the bridge from said series adjustable resistor to said voltage divider.

References Cited by the Examiner

UNITED STATES PATENTS

| | | | |
|---|---|---|---|
| 2,981,287 | 4/1961 | Caslow | 137—625.64 |
| 2,993,511 | 7/1961 | Johnson | 137—625.64 |
| 3,134,278 | 5/1964 | Hollander et al. | 228—2 |
| 3,162,068 | 12/1964 | Hardy | 228—2 |
| 3,188,047 | 6/1965 | Criffield | 137—625.64 |

WHITMORE A. WILTZ, *Primary Examiner.*

M. L. FAIGUS, *Assistant Examiner.*